United States Patent [19]

Dick et al.

[11] Patent Number: 4,857,287

[45] Date of Patent: Aug. 15, 1989

[54] FAST-DISSOLVING, NON-CAKING, FOOD GRADE SODIUM TRIPOLYPHOSPHATE

[75] Inventors: Chris C. Dick, Princeton, N.J.; Barry Schwartz, Yardley, Pa.; Bert D. McMunn, Princeton Junction, N.J.; Peter H. Zeh, Fremont, Calif.

[73] Assignee: FMC Corporation, Philadelphia, Pa.

[21] Appl. No.: 232,727

[22] Filed: Aug. 16, 1988

[51] Int. Cl.$^4$ ............... C01B 15/16; C01B 25/26
[52] U.S. Cl. ..................... 423/315; 423/305
[58] Field of Search .................. 423/305, 315

[56] References Cited

U.S. PATENT DOCUMENTS

| | | | |
|---|---|---|---|
| 3,054,656 | 9/1962 | Cassidy et al. | 423/315 |
| 3,361,675 | 1/1968 | Fuchs et al. | 423/315 |
| 3,431,069 | 3/1969 | Hudson et al. | 423/315 |
| 3,446,580 | 5/1969 | Fuchs | 423/315 |
| 3,600,317 | 8/1971 | Lintner | 252/99 |

FOREIGN PATENT DOCUMENTS 901258  5/1972  Canada .................. 423/315

*Primary Examiner*—Gregory A. Heller
*Attorney, Agent, or Firm*—Frank Ianno; Eugene G. Seems

[57] ABSTRACT

A fast-dissolving, non-caking, food grade sodium tripolyphosphate is produced by spraying into a spray dryer an aqueous sodium orthophosphate feed liquor having an $Na_2O:P_2O_5$ ratio of from about 1.60 to about 1.67 containing potassium hydroxide or a soluble potassium salt in amounts to yield about 0.4% to 0.8% by weight potassium in the final product, heating the feed to at least 440° C. to form sodium tripolyphosphate, cooling the sodium tripolyphosphate and adding to it at least about 1% by weight moisture.

4 Claims, No Drawings

FAST-DISSOLVING, NON-CAKING, FOOD GRADE SODIUM TRIPOLYPHOSPHATE

This invention relates to a spray drying process for producing a fast-dissolving, non-caking, food grade sodium tripolyphosphate In such drying processes, an aqueous solution of orthophosphate salts is subject in a single operation to spraying, rapid dehydration and intermolecular condensation to produce a solid sodium tripolyphosphate product. One-step drying processes for manufacturing sodium tripolyphosphate have been known for some time. U.S. Pat. No. 2,898,189 describes the conventional one-step spray drying process for making sodium tripolyphosphate. An orthophosphate (or pyrophosphate) liquor is sprayed into a spray dryer in contact with a heated gas stream and dried to sodium tripolyphosphate in 2 to 15 seconds by maintaining the exit gas temperature between 200° C. to 500° C. The sodium tripolyphosphate assay is reported as being between 98% and 100%.

There are two different crystalline modifications of sodium tripolyphosphate which are termed "Phase I" (or Form I) and "Phase II" (or Form II). Edwards and Herzog in Jacs., 79 (1957) 3647, disclose that Form I sodium tripolyphosphate forms first at temperatures as low as 225° C. Eventually, the Form I sodium tripolyphosphate is converted to Form II sodium tripolyphosphate. However, pure Form I sodium tripolyphosphate is not obtained at temperatures below 420° C., which temperature is the transition temperature from Form II to Form I. Processes for making either the Form I or the Form II sodium tripolyphosphate are well known in the art. For example, a process for making pure Form II sodium tripolyphosphate in a spray dryer from wet process acid is described in the U.S. Pat. No. 3,438,725. This patent discloses that spray dryer conditions that produce pure Form II sodium tripolyphosphate from thermal process acid produced Form II containing 15% to 30% Form I from wet process acid. The dryer exit gas temperature is always less than 420° C. (the Form II to Form I transition temperature). This patent discloses that the source of Form I in the Form II sodium tripolyphosphate made under these temperature conditions is small particles. The small particles lose water quickly in the flame zone of the dryer and get heated above 420° C. The patent focuses on getting these Form I particles to revert to Form II in the cooler exit gas stream. This occurs when the $SO_4$ and metallic impurities in the wet process acid are kept within certain limits.

A process for making high Form I content sodium tripolyphosphate is set forth in United Kingdom Patent No. 1,089,246. This patent discloses and claims a process for manufacture of sodium tripolyphosphate containing more than 40%, preferably, 60% up to approximately 100%, Phase I material (high temperature modification) by subjecting a dissolved orthophosphate in a single operation to spraying, rapid dehydration and intermolecular condensation, wherein sodium orthophosphate containing $P_2O_5$ and $Na_2O$ in the molar ratio of 3:5 is sprayed into a spray tower while allowing off-gases to leave the spray tower at temperatures of 400° C. to 520° C., preferably, 420° C. to 500° C., wherein the sodium tripolyphosphate is cooled within a period of time of less than 10 minutes, preferably less than 4 minutes, from initially 450° C. down to 280° C. and wherein, in the gas phase surrounding the sodium tripolyphosphate, a steam partial pressure value of less than about 300 mm. mercury, preferably less than 100 mm. mercury, is maintained, while the sodium tripolyphosphate is being cooled.

A second process for producing high Form I content sodium tripolyphosphate is set forth in U.S. Pat. No. 4,536,377. This patent discloses the manufacture of sodium tripolyphosphate containing greater than 75% of Form I material, and whose assay is 90% or greater of sodium tripolyphosphate, by spraying an aqueous sodium orthophosphate feed liquor having an $Na_2O:P_2O_5$ ratio of 1.60 to 1.70 into a spray dryer, dehydrating the sprayed feed at a temperature above 250° C. and below 420° C. in a period of up to one minute, removing sodium tripolyphosphate having a temperature of below 420° C. from the dryer and cooling the product to 150° C. or below, in 20 minutes or less.

Fast-dissolving sodium tripolyphosphate is desirable for many applications, but is especially essential in the food industry where the sodium tripolyphosphate must first be dissolved before being applied to food products in order to obtain a uniform application of the sodium tripolyphosphate throughout the food product. The presence of undissolved tripolyphosphate makes the resulting solution difficult to work with and sufficient amounts of the undissolved particles may result in clogging of the equipment used to convey the sodium tripolyphosphate solution to the foodstuff.

The dissolving properties of sodium tripolyphosphate are controlled by (1) the physical properties of the particles, and (2) the crystal-type distribution (relative proportion of Form I and Form II sodium tripolyphosphate). Particles with high surface area and low bulk density dissolve fastest. Since spray drying is the ideal way to make such particles, it is the process of choice for fast-dissolving sodium tripolyphosphate. However, during dissolution sodium tripolyphosphate, regardless of the particle type, can sometimes cake. Caking slows down or even prevents, complete dissolution. Caking is in part a function of crystal form distribution; high Form I containing sodium tripolyphosphate cakes the least and low Form I containing sodium tripolyphosphate cakes the most. However, tripolyphosphate which contains high amounts of Form I also is subject to caking and it is the problem of preventing caking of sodium tripolyphosphate that the present invention addresses.

In the production of sodium tripolyphosphate, the theoretical $Na_2O/P_2O_5$ mol ratio for sodium tripolyphosphate (STPP) is 5:3 or 1.667. In practice, the $Na_2O/P_2O_5$ mol ratio for the sodium orthophosphate mixture employed as the feed may range from 1.60 to 1.70 and yield a sodium tripolyphosphate product having an assay of least 90% sodium tripolyphosphate. However, mol ratios lower than the theoretical mol ratio for sodium tripolyphosphate are in fact seldom employed because at the lower mol ratios the by-product produced with the sodium tripolyphosphates is long-chain metaphosphates which are often insoluble in water. As a result the $Na_2O/P_2O_5$ mol ratio is almost never allowed to go below 1.67, and frequently is maintained higher than this to assure the absence of insoluble metaphosphates in the sodium tripolyphosphate product.

The present invention provides a process for producing a fast-dissolving, food grade sodium tripolyphosphate which is non-caking and which has a Form I concentration of greater than 75%, by spraying into a spray dryer, an aqueous sodium orthophosphate feed liquor having a $Na_2O:P_2O_5$ ratio of from 1.60 to 1.67, and preferably 1.680 to 1.690, containing potassium hydroxide or a soluble potassium salt in amounts to yield about 0.4% to 0.8% by weight potassium in the final product, dehydrating the sprayed feed with a hot gas stream, heating the dehydrated feed to a temperature of least 440° C. up to 630° C. to produce sodium tripolyphosphate, removing the sodium tripolyphosphate having a temperature of at least 440° C. from the spray dryer, passing the sodium tripolyphosphate into a cooler to cool the product and adding at least about 1% (preferably, about 1% to about 2%) by weight moisture to the sodium tripolyphosphate.

The above process has been found to yield a sodium tripolyphosphate which does not cake when tested in the "modified calgon caking test". This test is performed by adding 200 milliliters of room temperature distilled water to a 250 ml beaker. The beaker is positioned on top of a magnetic stirrer and a stirring bar 1"×5/16" in diameter (Fisher 9-311-9) is added to the beaker and centered. This is most conveniently done by starting the stirrer momentarily to center the bar and then turning off the stirrer. To the 200 ml of distilled water, 24 grams of granular sodium tripolyphosphate are added smoothly into the center of the beaker so that an even layer is formed on the bottom of the beaker. At the end of 2 minutes, after the sodium tripolyphosphate has been added, the stirrer is turned on to its highest speed and after 5 seconds of agitation, the product passes the test if all material is immediately dispersed (non-adhering to the bottom).

In the practice of the present invention, the feed liquor is normally an aqueous solution of dissolved sodium orthophosphates and/or pyrophosphates with an $Na_2O:P_2O_5$ mol ratio of 1.60 to 1.70. Preferably, the mol ratio is maintained at 1.680 to 1.690. This is somewhat higher than the theoretical ratio of 1.667 and is employed to prevent the formation of insoluble metaphosphates and to assure maximum conversion of the feed materials into sodium tripolyphosphate. The solution is preferably saturated or as close to saturated as possible to avoid having to evaporate any more water then necessary in the spray dryer, although solutions of the sodium orthophosphates and/or pyrophosphates which are less than saturated can be employed. To this aqueous solution, a potassium source is added in amounts to yield 0.4% to 0.8% potassium in the final sodium tripolyphosphate product. The source of the potassium is not critical so long as it is dissolved in the aqueous feed solution. The preferred potassium sources are potassium hydroxide and water soluble inorganic potassium salts such as potassium carbonates, potassium phosphates, potassium chlorides, potassium nitrates, potassium sulfates and the like. Of the inorganic potassium salts the salts having anions which do not leave any residual foreign irons are preferred such as potassium carbonate and potassium phosphates such as potassium pyrophosphate, potassium tripolyphosphate and mixtures thereof. The most preferred potassium source is potassium hydroxide. It is also possible to use potassium salt of organic acids provided they have sufficient solubility to dissolve in the feed liquor. Among the potassium salts which are capable of being used are the potassium salts of the lower saturated aliphatic acid series such as potassium formate, potassium acetate and potassium propenate, and the like. The amount of potassium that is employed in the feed liquor is very small, only about 0.4 to about 0.8 weight percent based on the weight of the final sodium tripolyphosphate product. Larger amounts of potassium, greater than 0.8 weight percent can be employed. However, it is not desired to have substantial amounts of other metals as ingredients in the sodium tripolyphosphate when this product is being used for food applications and, therefore, the amount of other metals which are permitted in food grade sodium tripolyphosphate may restrict the amount of potassium which can be employed. In addition, the potassium salts are much more expensive than sodium salts and, therefore, for economic reasons the amount of potassium source employed is reduced to that amount which will yield the desired product without large excesses.

In operation of the spray dryer in accordance with the present invention, the feed liquor is sprayed in contact with a heated gas stream in order to obtain rapid evaporation of the water in the feed liquor and conversion of the orthophosphates in the feed liquor into sodium tripolyphosphate having a minimum product temperature of at least 440° C. The product temperature is controlled by controlling the exit gas temperature; the exit gas temperature and the maximum product temperature are substantially the same. It is most important that the product temperature employed be at least 440° C. since temperatures lower than this do not yield a product which is noncaking even though the specified additives of potassium and moisture up to 2%, are employed in the process as described herein. The presence of the potassium hydroxide or soluble potassium salt in the feed liquor does not interfere in any way with the normal spray drying technique for making sodium tripolyphosphate from feed liquor in a spray dryer. However, the presence of the potassium source is necessary to assure consistent product that is non-caking. While it is possible to obtain a non-caking product in isolated batches by carrying out the instant process without potassium source addition, reproducibility ability of these results have been found difficult; to obtain consistent non-caking product properties in the final sodium tripolyphosphate product it has been found necessary to use potassium source addition along with the other parameters of the present process.

Upon recovery of the sodium tripolyphosphate at a temperature of at least 440° C., this product is then passed into a cooler. The cooler can be either water cooled or air cooled and cools the sodium tripolyphosphate to a temperature where it can be handled on conveyor equipment without problems. In general, temperatures of from room temperature to 150° C. are commonly reached when the product exits the cooler. The time required for cooling can vary, but is generally completed in 20 minutes, although longer periods can be used if desired. The sodium tripolyphosphate is then passed into a screw conveyor equipped with overhead water sprays where water is introduced into the sodium tripolyphosphate product while it is being agitated and conveyed to a storage bin, to assure distribution of the water onto the sodium tripolyphosphate product. The introduction of about 1% water to the sodium tripolyphosphate has been found sufficient to obtain the non-caking properties in the sodium tripolyphosphate product. Larger amounts of water up to and above 2% have been found to be effective without any problems. However, when one increases the amount of moisture substantially beyond about 2%, the excess water interferes with assay specifications for the sodium tripolyphosphate which render the use of these excess amounts of water undesirable.

In the above description of the invention, the water is added to the sodium tripolyphosphate after it has emerged from the cooler. While in theory, it is also possible to add the moisture while the sodium tripolyphosphate is being cooled, this procedure is more difficult because more of the moisture is evaporated from the hot sodium tripolyphosphate and control of the moisture level becomes much more difficult. For this reason, it is generally preferred to add the water to the sodium tripolyphosphate to obtain the desired moisture level after the sodium tripolyphosphate has gone through the cooler.

The following examples were carried out in a commercial spray dryer having a gas flame source at the top of the dryer at the air intake. The flame quickly heats the incoming air, so that the resultant heated air flows about two-thirds of the way down the dryer, exits through a side duct to cyclone separators where sodium tripolyphosphate particles are separated, through a scrubber and up to a stack where the air is forced out by a blower. The sodium tripolyphosphate feed liquor is directed up toward the dryer (gas) flame through a set of spray nozzles. The spray is so directed that it does not go through the flame as this cools the flame, interferes with combustion and causes soot formation. In the hot-test part of the dryer, near the flame, water is still evaporating so at that point the product temperature does not exceed the boiling point of water. Due to the evaporation of water, the product temperature never exceeds the exit gas temperature during normal dryer operation. The exit gas temperature and the crystalline product temperature are substantially the same. This type of dryer is described in U.S. Pat. No. 3,661,514. The sodium tripolyphosphate particles are dried and calcined in the dryer. About half to two-thirds of the sodium tripolyphosphate formed falls to the bottom of the dryer where it is removed by a conveyor to a cooler. The product temperature at the bottom of the dryer is substantially the same or slightly lower than the exit gas temperature. The remaining sodium tripolyphosphate leaves the dryer with the exit gases through a duct to the cyclone separators. Sodium tripolyphosphate from the bottom of the dryer is removed by a conveyor to a cooler where it is cooled from a temperature of at least 440° C. to a temperature of from 40° C. to 150° C. in about 20 minutes. Both the sodium tripolyphosphate recovered from the bottom of the dryer and the sodium tripolyphosphate recovered from the cyclone separators are passed through the cooler as a mixed stream. Sodium tripolyphosphate samples were analyzed for assay by standard chromatography techniques using an automatic analyzer. The samples were analyzed for Phase I content by standard x-ray diffraction techniques using known samples for comparison. In carrying out these examples, the feed liquor temperature was maintained between 95° C. and 100° C. and the liquor had an $Na_2O/P_2O_5$ ratio of from 1.680 to 1.690. The amount of potassium addition and/or water addition is set forth in Table I, as is the dryer outlet temperature, employed in the various runs set forth in Table I. The resulting products in all cases had a sodium tripolyphosphate assay of between 87 and 95 weight percent, a Phase I content of from 85 to 90 weight percent, and a bulk density of 0.55 to 0.65 grams/cc. The size distribution of the product was as follows: −12 mesh 100 weight percent, −20 mesh 90 to 95 weight percent, −30 mesh 75 to 80 weight percent, −60 mesh 30 to 40 weight percent, −100 mesh 10 to 15 weight percent. The resulting sodium tripolyphosphates from each of the runs in Table I were subject to the caking test set forth above to determine whether they passed or failed this test. The results are set forth in Table I.

Pursuant to the requirements of the patent statutes, the principles of this invention have been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise is specifically described and exemplified herein.

TABLE I

| Test | Temp. (°C.) | Moisture Added (%) | Potassium Added (%) | Caking Test (pass/fail) | Comments |
|---|---|---|---|---|---|
| 1 | 400 | 1 | 0.8 | fail | at 400° C., it fails even with additives |
| 2 | 420 | 0 | 0.7 | fail | at 420° C., it fails without additives |
| 3 | 420 | 0.6 | 0.8 | fail | at 420° C., it is only borderline with additives |
| 4 | 420 | 1 | 0.7 | pass | although this passed, it was not reproducible |
| 5 | 420 | 1 | 0.8 | fail | same as test 3 |
| 6 | 420 | 1 | 0.8 | fail | same as test 3 |
| 7 | 440 | 0 | 0.07 | fail | at 440° C., product fails without additives |
| 8 | 440 | 0 | 0.4 | fail | at 440° C., with K it is borderline without added moisture |
| 9 | 440 | 0 | 0.6 | fail | same as test 8 |
| 10 | 440 | 0.5 | 0.4 | fail | same as test 8 |
| 11 | 440 | 1 | 0.07 | pass | product with moisture and no K passed but not consistent in reproducibility |
| 12 | 440 | 1 | 0.4 | pass | product with K and $H_2O$ are consistently and totally non-caking |
| 13 | 440 | 1 | 0.6 | pass | same as test 12 |
| 14 | 440 | 1 | 0.6 | pass | same as test 12 |

We claim:

1. A spray drying process wherein spraying, rapid dehydration and intermolecular condensation are carried out in a single operation to produce a fast-dissolving, non-caking, food grade sodium tripolyphosphate having a Form I concentration greater than 75% consisting essentially of the steps of spraying into a spray dryer an aqueous sodium orthophosphate feed liquor having an $Na_2O:P_2O_5$ ratio of 1.60 to 1.67 and containing potassium hydroxide or a soluble potassium salt in amounts to yield about 0.4% to 0.8% by weight potassium in the final product, dehydrating the sprayed feed with a hot gas stream, heating the dehydrated feed to a temperature of at least 440° C. up to 630° C. to produce sodium tripolyphosphate, removing the sodium tripolyphosphate having a temperature of at least 440° C. from the spray dryer, passing the sodium tripolyphosphate into a cooler to cool the product and adding at least about 1% moisture to the sodium tripolyphosphate product.

2. The process of claim 1 where the temperature of the sodium tripolyphosphate is at least 440° C. up to 500° C.

3. The process of claim 1 where the $Na_2O:P_2O_5$ ratio of the feed liquor is from about 1.680 to about 1.690.

4. The process of claim 1 where the moisture content which is added to the sodium tripolyphosphate is maintained from about 1 to about 2 weight percent.

* * * * *